(12) United States Patent
Young et al.

(10) Patent No.: US 8,254,282 B2
(45) Date of Patent: Aug. 28, 2012

(54) SYSTEM AND METHOD FOR HIERARCHICAL VISUALIZATION OF DATA

(75) Inventors: Jason A. Young, Plano, TX (US); Sunil L. Mandya, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 317 days.

(21) Appl. No.: 12/638,885

(22) Filed: Dec. 15, 2009

(65) Prior Publication Data

US 2011/0141923 A1    Jun. 16, 2011

(51) Int. Cl.
*H04L 12/26* (2006.01)
*G06T 11/00* (2006.01)
(52) U.S. Cl. .................. 370/252; 345/440; 709/224
(58) Field of Classification Search .................. None
See application file for complete search history.

(56) References Cited

U.S. PATENT DOCUMENTS

| | | | | |
|---|---|---|---|---|
| 5,867,483 | A * | 2/1999 | Ennis et al. | 370/252 |
| 6,977,936 | B1 * | 12/2005 | Love et al. | 370/395.5 |
| 7,143,159 | B1 * | 11/2006 | Grace et al. | 709/224 |
| 8,024,651 | B1 * | 9/2011 | Error | 715/215 |
| 2002/0091636 | A1 * | 7/2002 | Carroll Bullard | 705/40 |
| 2002/0165980 | A1 * | 11/2002 | Brown | 709/242 |
| 2009/0013287 | A1 * | 1/2009 | Helfman et al. | 715/853 |
| 2009/0055501 | A1 * | 2/2009 | Wang et al. | 709/207 |

\* cited by examiner

*Primary Examiner* — Min Jung
(74) *Attorney, Agent, or Firm* — Michael J. Fogarty, III

(57) ABSTRACT

A system and method for monitoring IP flows in a network is disclosed. A plurality of monitor probes are coupled to links in the network, the monitor probes capture data packets from the links and determine protocols in OSI Layers 3, 4, and 5/7 of the packets. A user interface receives user inputs selecting the links and protocols for analysis. A display is coupled to the monitor probes and the user interface. The display and user interface receiving a user selection of links for analysis and display a first protocol analysis to the user, the first protocol analysis display comprising a pie chart representing all OSI Layer 3 protocols captured on the selected links, a pie chart representing all OSI Layer 4 protocols captured on the selected links, and a pie chart representing all OSI Layer 5/7 protocols captured on the selected links.

15 Claims, 4 Drawing Sheets

SYSTEM AND METHOD FOR HIERARCHICAL VISUALIZATION OF DATA

TECHNICAL FIELD

Embodiments are directed, in general, to displaying network data to users and, more specifically, to displaying network data in a hierarchical format.

BACKGROUND

Fixed and wireless telecommunications networks comprise many network nodes interlinked by high speed interfaces. The interfaces transport control plane and user plane data packets across the telecommunications networks. Typical network interfaces may be 10GE links supporting thousands of subscriber sessions, wherein each session uses one of many different protocols. Network operators may use monitoring equipment to analyze the network's performance. The monitoring equipment captures data packets from the links and presents the data to a user. The volume of data captured from the links is enormous and includes information for each of the OSI (Open Systems Interconnection) layers of the protocols used in thousands of sessions.

Presenting the data captured from network links to users in a manner that is understandable and useful is difficult to achieve because there is simply too much data to display to the user. The amount of data can overwhelm the user and important data becomes buried.

SUMMARY

Visualizing hierarchical data in a way that does not overwhelm a user is a problem that needs to be solved. In many cases, there is simply too much data to display to the user, and what is important becomes buried.

Traditionally, display of hierarchical data is shown in some kind of tabular or tree format. Displaying hierarchical data in this way can overwhelm because there is too much data to display to the user, and what is important becomes buried. Embodiments of the present invention are directed to a new way of displaying hierarchical data that is based on the concept of progressive disclosure. The tree concept has been taken and expanded upon, using traditional pie charts to represent each level in a hierarchical data structure.

At the root node of the hierarchical data, the pie chart will contain at most N+1 slices in which the top N categories are displayed, and the last (N+1) slice represents one or more categories that are outside of the "top N". This segment is known as the "other" category and is represented as the summary of these remaining categories.

Subsequent levels or cross-sections of the hierarchical data are represented as additional pie charts. The initial representation given to these pie charts reflects a summary of categories present at that level regardless of parent node. The subsequent levels also contain the N+1 segmenting concept explained above.

Embodiments of the invention comprise the ability to select (e.g. "click" on) a slice in each pie chart to select the represented protocol segment. This selection changes the data being shown by the pie charts to reflect data from deeper levels of the hierarchical structure. The selection acts as a filter to the lower level data. On selection, the selected slice is highlighted or shown in an exploded view on the display to indicate selection. Selecting a segment a second time acts to deselect the protocol. The lowest level of pie chart does not include this filter capability. Selection at this level can be interpreted as a drilldown to other applications or pages of data.

BRIEF DESCRIPTION OF THE DRAWINGS

Figure 1:
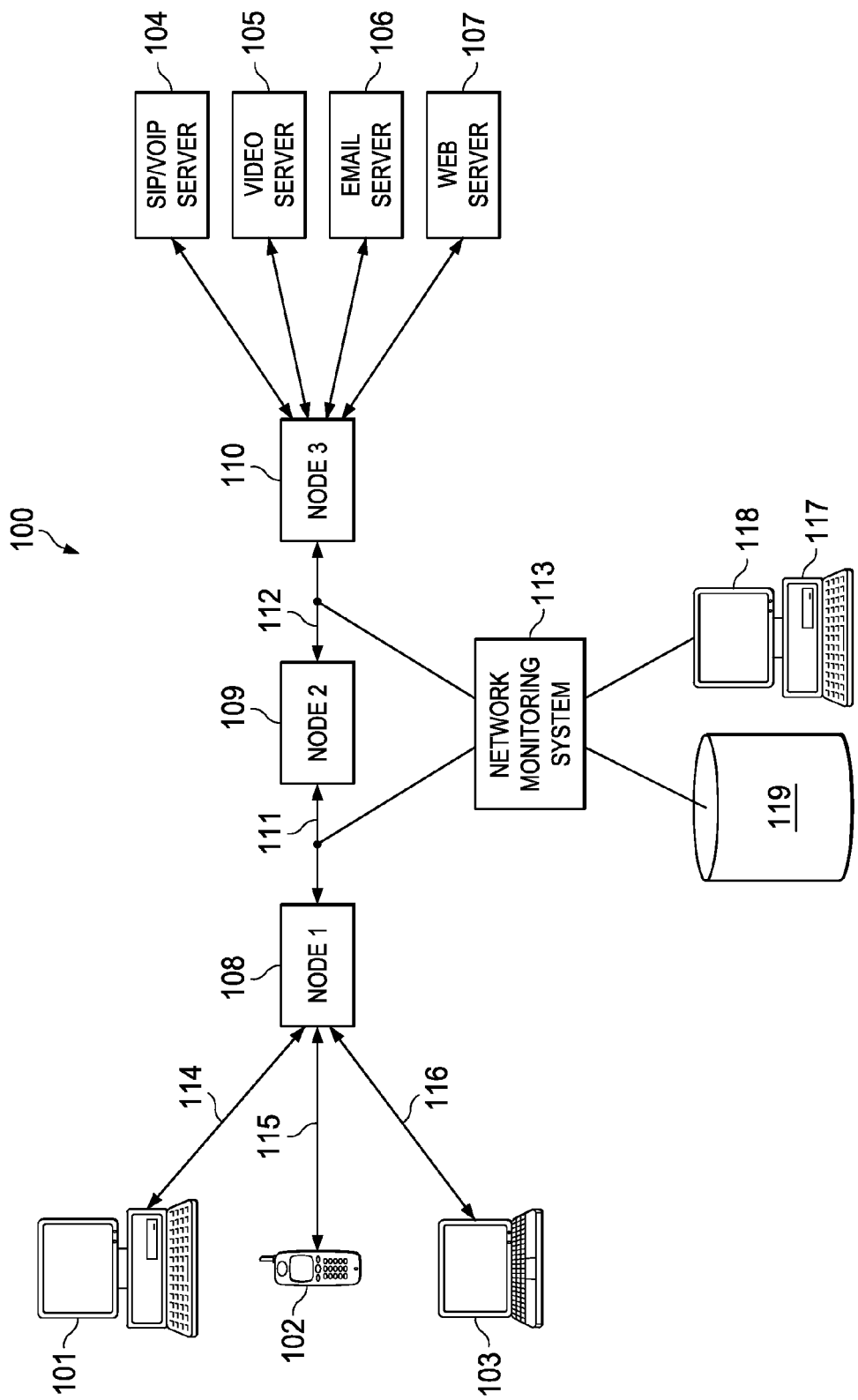
Figure 2:
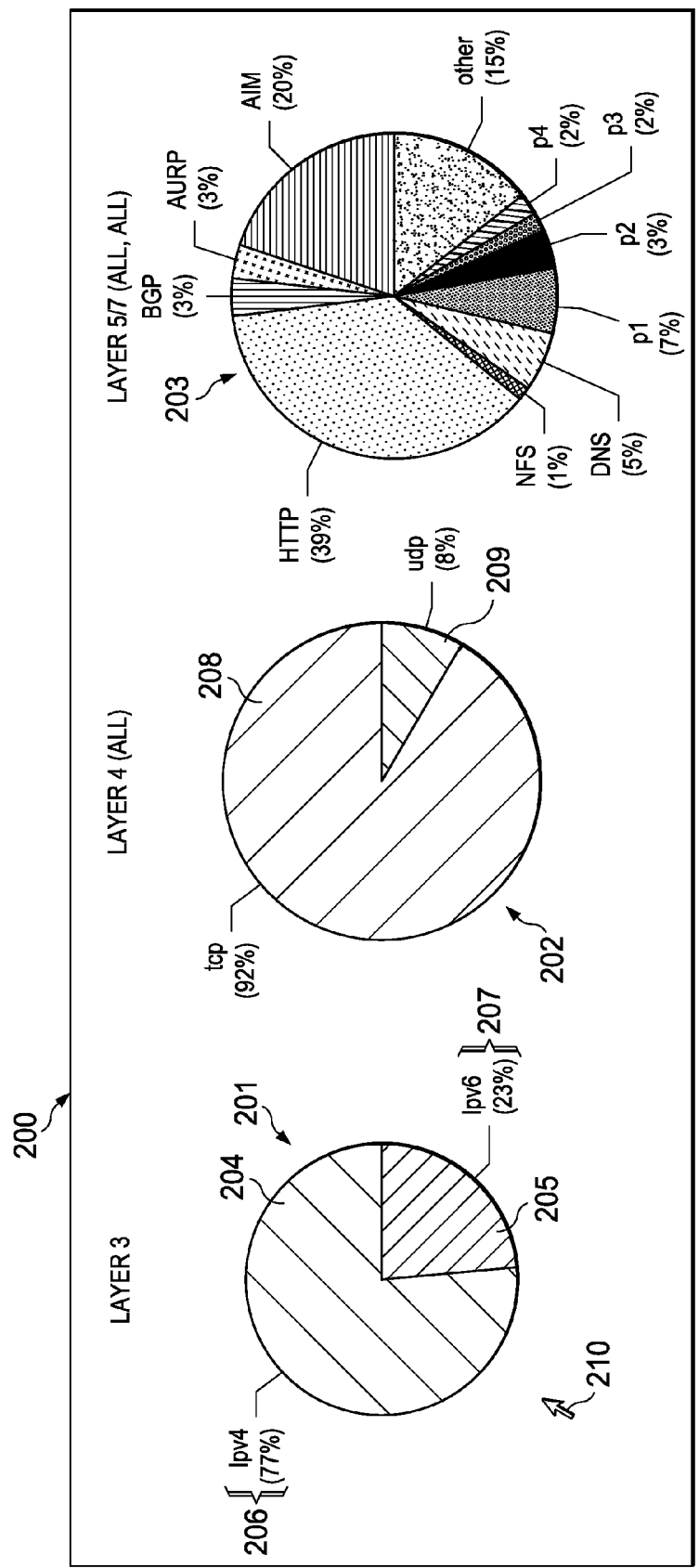
Figure 3:
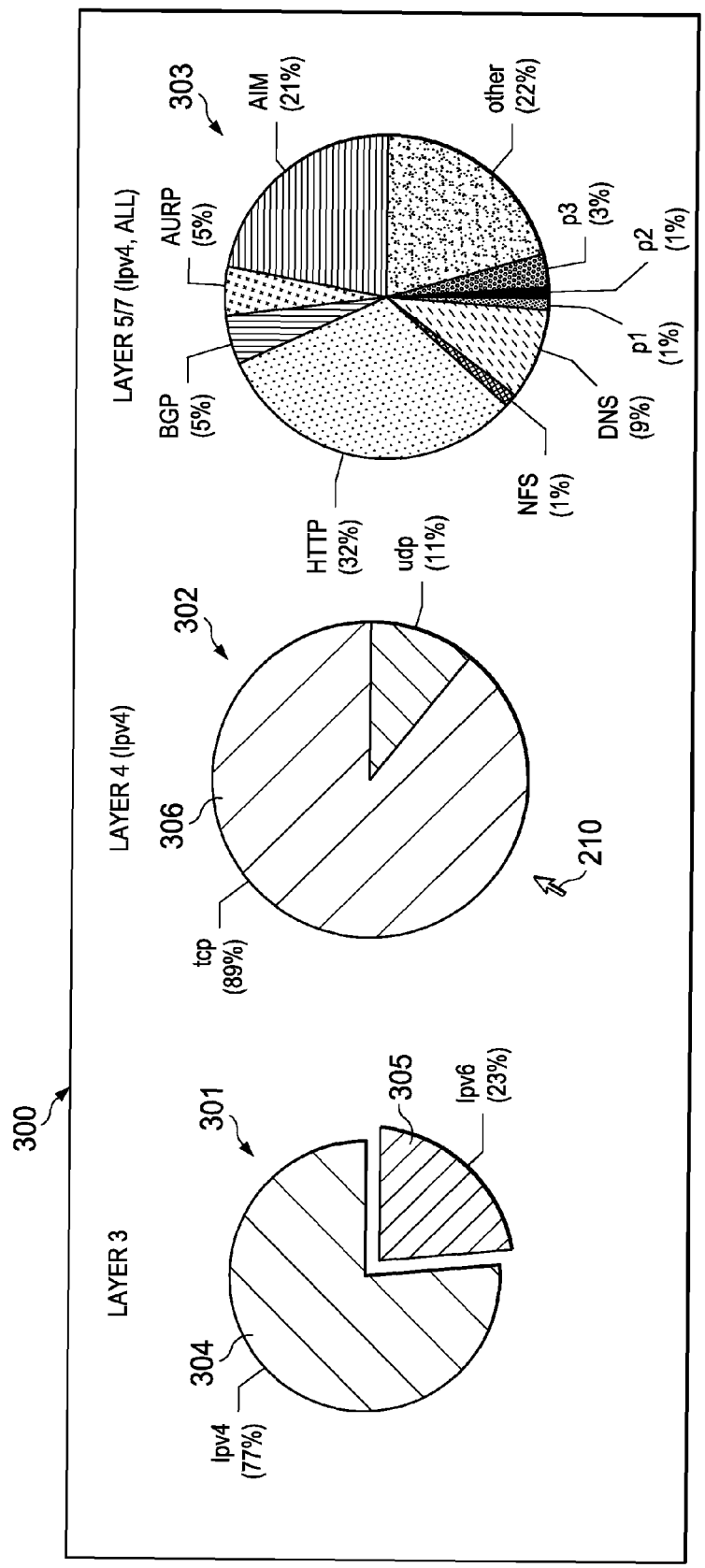
Figure 4:
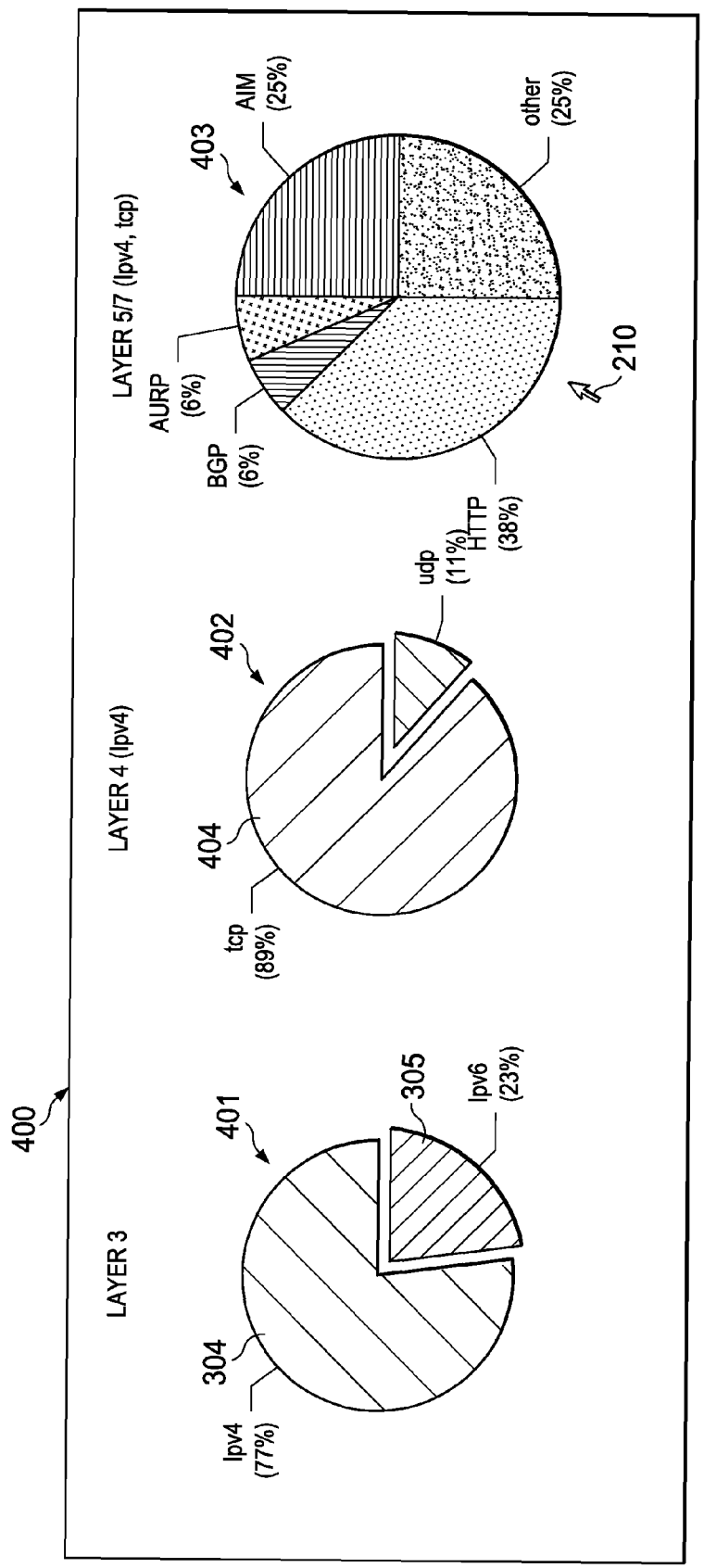

Having thus described the system and method in general terms, reference will now be made to the accompanying drawings, which are not necessarily drawn to scale, and wherein:

FIG. 1 illustrates an exemplary data network;

FIG. 2 illustrates an exemplary display according to embodiments of the invention;

FIG. 3 illustrates another exemplary display according to embodiments of the invention; and FIG. 4 illustrates another exemplary display according to embodiments of the invention.

DETAILED DESCRIPTION

FIG. 1 illustrates an exemplary data network 100 in which users at devices 101-103 access data or applications on servers 104-107 via nodes 108-110 across links 111-112. FIG. 1 is a high-level representation of a data network for discussion purposes only and is not intended to limit the inventions disclosed herein to any particular network or protocol. Devices 101-103 may be computers, mobile devices, user equipment (UE), or client applications, for example. Nodes 108-110 and links 111-112 may represent a single service provider's network or may represent components of multiple networks. For example, node 108 may be part of a wireless or cellular network, such as a wireless access point, cellular system base station or node B, and/or part of an internet service provider's (ISP) network, such as a router or modem. Devices 101-103 access node 108 via wireless or wireline connections 114-116. Nodes 109-110 may be components in an intranet, Internet, or public data network, such as a router or gateway. Nodes 109-110 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, or a Mobile Management Entity (MME) in a Long Term Evolution/Service Architecture Evolution (LTE/SAE) network, for example, or any other data network component.

Many packets traverse links 111-112 and nodes 108-110 as data is exchanged between devices 101-103 and servers 104-107. These packets may represent many different sessions and protocols. For example, if device 103 is used for a voice or video call, then device 103 may exchange Voice over Internet Protocol (VoIP) or Session Initiation Protocol (SIP) data packets with SIP/VoIP server 104 using Real-Time Transport Protocol (RTP). If device 102 is used to send or retrieve email, device 102 may exchange Internet Message Access Protocol (IMAP), Post Office Protocol 3 Protocol (POP3), or Simple Mail Transfer Protocol (SMTP) messages with email server 106. If device 101 is used to down load or stream video, device 101 may use Real Time Streaming Protocol (RTSP) to establish and control media sessions with video server 105. Alternatively, the user at device 101 may access a number of websites using Hypertext Transfer Protocol (HTTP) to exchange data packets with web server 107. It will be understood that packets exchanged between devices 101-103 and servers 104-107 may conform to numerous other protocols now known or later developed. In an exemplary system, approximately one percent of the packets traversing network 100 carry control data, such as information for setting-up, managing or tearing-down calls or sessions between devices 101-103 and servers 104-107. The other ninety-nine percent of the packets carry user data, such as actual voice, video, email or information content to and from devices 101-103.

Network monitoring system 113 may be used to monitor the performance of network 100. Monitoring system 113 captures packets that are transported across links 111-112 and any other network links or connections. In one embodiment, packet capture devices are non-intrusively coupled to network links 111-112 to capture substantially all of the packets transmitted across the links. Although only two links 111-112 are shown in FIG. 1, it will be understood that in an actual network there may be dozens or hundreds of physical, logical or virtual connections and links between network nodes. In one embodiment, network monitoring system 113 is coupled to all or a high percentage of these links. In other embodiments, network monitoring system 113 may be coupled only to a portion of network 100, such as only to links associated with a particular service provider. The packet capture devices may be part of network monitoring system 113, such as a line interface card, or may be separate components that are remotely coupled to network monitoring system 113 from different locations.

Monitoring system 113 preferably comprises one or more processors running one or more software applications that collect, correlate and analyze media and signaling data packets from network 100. Monitoring system 113 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. Such functionality is provided, for example, by the Iris Analyzer toolset available from Tektronix, Inc. The packet capture devices coupling network monitoring system 113 to links 111-112 may be high-speed, high-density 10GE probes that are optimized to handle high bandwidth IP traffic, such as the GeoProbe G10 available from Tektronix, Inc. A service provider or network operator may access data from monitoring system 113 via user interface station 117 having a display or graphical user interface 118, such as the IrisView configurable software framework that provides a single, integrated platform for all applications, including feeds to customer experience management systems and operation support system (OSS) and business support system (BSS) applications, which is also available from Tektronix, Inc. Monitoring system 113 may further comprise internal or external memory 119 for storing captured data packets, user session data, call records and configuration information. Monitoring system 113 may capture and correlate the packets associated specific data sessions on links 111-112. In one embodiment, related packets can be correlated using a 5-tuple association mechanism. The 5-tuple association process uses an IP correlation key that consists of 5 parts—server IP address, client IP address, source port, destination port, and Layer 4 Protocol (TCP or UDP or SCTP). The related packets can be combined into a record for a particular flow, session or call on network 100.

As the capability of network 100 increases toward 10GE or higher, each link 111-112 supports more users' data flows and sessions. In one embodiment, links 111-112 are 10GE interfaces supporting thousands of users. Many of the subscribers may have multiple active sessions, which results in thousands of active flows on link 111-112 at any time where each flow includes many packets. With such a very large volume of packets, it becomes difficult for a service provider or network operator to analyze all the traffic across network 100 and to identify problem nodes or links.

Traditionally, this kind of data would be displayed in a tabular or tree format. However, such formats do not provide users with easily and quickly understood information and do not allow for interaction with the data. To solve this problem, embodiments of the present invention display hierarchical network data in a format based on the concept of progressive disclosure in which pie charts represent multiple levels of data.

FIG. 2 illustrates an exemplary display 200 according to one embodiment of the invention. In one embodiment, display 200 may be presented to a user, for example, via user interface 118 (FIG. 1). Display 200 comprises a plurality of pie charts 201-203 which represent information about different OSI layers of captured data packets. The information shown in display 200 may correspond to packets captured from all of the links in a network, from a selected group of links, or from a specific link. Display 200 can also be used to present hierarchical data for any network element, such as Virtual Local Area Network (VLAN), server, or network node, as well for traffic on network links.

Pie chart 201 represents Layer 3 (Network Layer) information for all of the captured packets. Pie chart 201 is divided into "slices" or segments 204-205, which correspond to the Internet Protocol versions of the packets. The relative size of the slices in pie charts 201-203 correspond to the percentage of that type of data packet. For example, segment 204 corresponds to IPv4 packets, and segment 205 corresponds to IPv6 packets. Segment is drawn to have a size representing 77% of pie chart 201. Segment 204 may also be labeled with the type of information represented and a numerical percentage value, such as "IPv4" "77%" (206), or a total number of corresponding IPv4 packets (not shown). The rest of the network packets (23% of the total packets) are IPv6 packets. These are displayed as segment 205, which is labeled accordingly (207).

Pie chart 202 corresponds to the Layer 4 (Transport Layer) information for all of the packets. The captured packets are either TCP (Transmission Control Protocol) or UDP (Transmission Control Protocol) Internet Protocol traffic. In the illustrated example, 92% of the packets are TCP and 8% are UDP, which percentages are shown by the size of segments 208 and 209 and by the corresponding text labels.

Pie chart 203 corresponds to the Layer 5/7 (Session Layer/Application Layer) information for all of the captured packets. In the illustrated example, the captured packets correspond to a number of different Layer 5/7 protocols. Most of these protocols are represented individually in pie chart 203 with a designated segment and corresponding text label. However, because there may be many different Layer 5/7 protocols in use on the network at any one time, only the top "N" protocols are displayed individually. The number N may be a preset value or may be configured by the user. The pie chart will contain at most N+1 slices. The top N categories or protocols are displayed as pie chart slices 1 to N. The N+1 slice represents the remaining categories or protocols that had fewer packets per category than the top N categories. The N+1 slice is labeled as an "Other" category and its relative size corresponds to the sum or the packets in the remaining categories. The use of the "other" category to display only the top N categories or protocols for a particular layer may be applied to the Layer 3 and Layer 4 displays in a similar manner.

In the illustrated example, a number of well known Layer 5/7 protocols are displayed, such as HTTP, NFS (Network File System), DNS (Domain Name Service), BGP (Border Gateway Protocol), AURP (AppleTalk Update-Based Routing Protocol), and AIM (AOL Instant Messaging), and several generic protocol labels P1-P4. It will be understood that these protocols—and the Layer 3 and Layer 4 protocols—are used in FIG. 2 for illustrative purposes only and are not intended to limit the present invention to any particular protocols or to require any specific protocols.

The user can select any segment in pie charts 201-203 for further analysis of the network data. For example, a mouse or other pointing device may be used to position cursor 210 over IPv4 segment 204 on display 200. The user then "clicks" on segment 204 to select IPv4 data for further analysis, which corresponds to drilling down into the next layer of data. Subsequent levels of data are represented as additional pie charts. The initial representation given to these subsequent pie charts reflect the summary of categories at the next level regardless of data in the parent node. The subsequent levels also use the N+1 concept explained above, as appropriate.

FIG. 3 illustrates another exemplary display 300 according to one embodiment of the invention. Display 300 is the result of selecting IPv4 segment 204 on display 200 (FIG. 2) and comprises a plurality of pie charts 301-303, which represent information associated with different OSI layers in captured IPv4 data packets only. The information shown in display 300 may correspond to packets captured from all of the links in a network, from a selected group of links, from a specific link, or from a network element or node; however, this data is limited to packets that use IPv4 in Layer 3.

Pie chart 301 is similar to pie chart 201 and represents Layer 3 (Network Layer) information; however, in pie chart 301, IPv4 segment 304 is highlighted to show that this segment has been selected for further analysis. The total group of captured packets for the selected link or group of links still comprises 77% IPv4 packets and 23% IPv6 packets as illustrated in pie charts 201 and 301. Changes from display 200 to display 300 are more apparent in pie charts 302 and 303.

Pie chart 302—like pie chart 202—corresponds to Layer 4 (Transport Layer) information. The captured packets are either TCP (Transmission Control Protocol) or UDP (Transmission Control Protocol) Internet Protocol traffic. However, in pie chart 302, only packets that have IPv4 Layer 3 packets (i.e. the selected protocol in pie chart 301) are represented. In the illustrated example, 89% of the IPv4 packets use TCP and 8% of the IPv4 packets use UDP. These numbers are specific only to the selected IPv4 segment 304. These percentages in chart 302 differ from the percentages in chart 202 because only IPv4 packets are represented in FIG. 3, while FIG. 2 represented all captured packets without regard to a specific network layer (Layer 3) protocol.

Pie chart 303—like pie chart 203—corresponds to Layer 5/7 (Session Layer/Application Layer) information. The captured packets correspond to a number of different Layer 5/7 protocols. However, in pie chart 303, only IPv4 packets are shown. Comparing pie chart 303 to chart 203, it is apparent that protocol 4 (p4) is not displayed. This means that the p4 protocol is either not carried on the IPv4 packets (or at least not carried on the captured packets). The percentages of packets for each Layer 5/7 protocol are recalculated and displayed in pie chart 303 to represent only IPv4 packets.

Alternatively, the user may have selected segment 205 in display 200 (FIG. 2) to drill down into the IPv6 packets. If segment 205 had been selected, then the pie charts for Layer 4 and Layer 5/7 (302, 303) would display only IPv6 packets.

The user can select any segment in pie charts 301-303 for further analysis of the network data. For example, a mouse or other pointing device may be used to position cursor 210 over TCP segment 306 on display 200. The user then "clicks" on segment 306 to select TCP data for further analysis, which corresponds to drilling down into a further layer of data.

FIG. 4 illustrates another exemplary display 400 according to one embodiment of the invention. Display 400 is the result of selecting TCP segment 306 on display 300 (FIG. 3) and comprises a plurality of pie charts 401-403, which represent information associated with different OSI layers in captured IPv4+TCP data packets only. The information shown in display 400 may correspond to packets captured from all of the links in a network, from a selected group of links, or from a specific link; however, this data is limited to packets that use IPv4 in Layer 3 and TCP in Layer 4

Pie chart 401 is similar to pie chart 301 and represents Layer 3 (Network Layer) information. IPv4 segment 304 is highlighted to show that this segment has been selected for further analysis. The proportions of segments 304 and 305 are the same as shown in pie chart 301 (FIG. 3) because no further filtering has been selected.

Pie chart 402—like pie charts 202 and 302—corresponds to Layer 4 (Transport Layer) information. Segment 404 has been highlighted to show that this segment has been selected for further analysis. Display 400 shows that 89% of the IPv4 packets use TCP and 8% of the IPv4 packets use UDP. These numbers are the same as pie chart 302 because they are specific to the selected IPv4 segment 304 only, just as shown in pie chart 302.

Pie chart 403—like pie charts 203 and 303—corresponds to Layer 5/7 (Session Layer/Application Layer) information. The captured packets correspond to a number of different Layer 5/7 protocols. However, in pie chart 403, only packets using both IPv4 and TCP are shown. If pie chart 403 is compared to charts 203 and 303, it is apparent that several protocols are not displayed. For example, the NFS, DNS, p1, p2, and p3 protocols are not shown. These means that these protocols are either not carried on the IPv4/TCP packets (or at least not carried on this group of captured packets). The percentages of packets for each Layer 5/7 protocol are recalculated and displayed in pie chart 403 to represent only IPv4/TCP packets.

Pie chart 403 does not provide the filter capability to create a new group of pie charts. If the user selects segments of pie chart 403 (or pie charts 203,303) then the monitoring equipment will interpret the selection as a drilldown to other data pages or applications that are specific to the Layer 5/7 application, such a list or summary of packets associated with the application.

The user is not limited to selecting segments of the pie chart displays in sequential order. Although the examples above illustrated a user selecting a Layer 3 segment, then a Layer 4 segment, and then a Layer 5/7 segment, it will be understood by those of skill in the art that the user may select any segment in any of the pie chart layers at any time. Accordingly, in alternative embodiments, the user may select any segment in pie charts 201-203 (FIG. 2) in any order to drill-down into the underlying data.

Although the examples herein refer to data packets or packet counts in describing the hierarchical display, it will be understood by those of skill in the art that the hierarchical display can be applied to any measurement in a network or system that is counter-based. The data shown on the charts could also represent other key performance indicators (KPI), bytes, octets, or the like.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of monitoring a telecommunications network having a plurality of network nodes coupled by a plurality of links, comprising:
   capturing data packets from the links in the telecommunications network via plurality of monitoring probes;
   classifying the data packets by protocols used in the data packets;
   receiving a user selection of a group of one or more of the plurality of links;
   displaying a first information level to the user, the first information level display comprising a pie chart representing all OSI Layer 3 protocols in use on the selected links, a pie chart representing all OSI Layer 4 protocols in use on the selected links, and a pie chart representing all OSI Layer 5/7 protocols in use on the selected links;
   receiving a user selection of one of the Layer 3 protocols;
   displaying a second information level to the user, the second information level display comprising a pie chart representing all OSI Layer 3 protocols in use on the selected links, a pie chart representing OSI Layer 4 protocols associated with packets having the selected Layer 3 protocol in use on the selected links, and a pie chart representing all OSI Layer 5/7 protocols associated with packets having the selected Layer 3 protocol in use on the selected links;
   receiving a user selection of one of the Layer 4 protocols; and
   displaying a third information level to the user, the third information level display comprising a pie chart representing all OSI Layer 3 protocols in use on the selected links, a pie chart representing OSI Layer 4 protocols associated with packets having the selected Layer 3 protocol in use on the selected links, and a pie chart representing all OSI Layer 5/7 protocols associated with packets having both the selected Layer 3 protocol and the selected Layer 4 protocol in use on the selected links.

2. The method of claim 1, further comprising:
   highlighting the selected Layer 3 protocol in the second information level display.

3. The method of claim 2, further comprising:
   highlighting the selected Layer 4 protocol in the third information level display.

4. The method of claim 1, further comprising:
   highlighting the selected Layer 3 protocol in the second information level display; and
   highlighting the selected Layer 4 protocol in the third information level display.

5. The method of claim 1, further comprising:
   receiving a user selection of one of the Layer 5/7 protocols; and
   displaying information specific to the selected Layer 5/7 protocol.

6. A system for monitoring IP flows in a telecommunications network comprising a plurality of network nodes interconnected by a plurality of links, comprising:
   a plurality of monitor probes coupled to the links in the telecommunications network, the monitor probes capturing data packets from the links and analyzing the data packets to determine protocols in OSI Layers 3, 4, and 5/7 of the data packets;
   a user interface adapted to receive user inputs selecting the links and protocols for analysis; and
   a display coupled to the monitor probes and the user interface, the display and user interface respectively configured to:
   receive a user selection of one or more of the links;
   display a first traffic characterization to the user, the first traffic characterization display comprising a pie chart representing all OSI Layer 3 protocols captured on the selected links, a pie chart representing all OSI Layer 4 protocols captured on the selected links, and a pie chart representing all OSI Layer 5/7 protocols captured on the selected links;
   receive a user selection of one of the Layer 3 protocols;
   display a second traffic characterization to the user, the second traffic characterization display comprising a pie chart representing all OSI Layer 3 protocols captured on the selected links, a pie chart representing OSI Layer 4 protocols associated with packets having the selected Layer 3 protocol captured on the selected links, and a pie chart representing all OSI Layer 5/7 protocols associated with packets having the selected Layer 3 protocol captured on the selected links;
   receive a user selection of one of the Layer 4 protocols; and
   display a third traffic characterization to the user, the third traffic characterization display comprising a pie chart representing all OSI Layer 3 protocols captured on the selected links, a pie chart representing OSI Layer 4 protocols associated with packets having the selected Layer 3 protocol captured on the selected links, and a pie chart representing all OSI Layer 5/7 protocols associated with packets having both the selected Layer 3 protocol and the selected Layer 4 protocol captured on the selected links.

7. The system of claim 6, wherein the display is further configured to:
   highlight the selected Layer 3 protocol in the second information level display.

8. The system of claim 7, wherein the display is further configured to:
   highlight the selected Layer 4 protocol in the third information level display.

9. The system of claim 6, wherein the display is further configured to:
   highlight the selected Layer 3 protocol in the second information level display; and
   highlight the selected Layer 4 protocol in the third information level display.

10. The system of claim 6, wherein the display and user interface are further respectively configured to:
    receive a user selection of one of the Layer 5/7 protocols; and
    display information specific to the selected Layer 5/7 protocol.

11. A computer program product that includes a computer readable medium useable by a network monitoring system, the medium having stored thereon a sequence of instructions which, upon execution by a processor within the network monitoring system, causes the network monitoring system to:
    capture data packets from the links in the telecommunications network via plurality of monitoring probes;
    classify the data packets by protocols used in the data packets;
    receive a user selection of a group of one or more of the plurality of links;
    display a first information level to the user, the first information level display comprising a pie chart representing all OSI Layer 3 protocols in use on the selected links, a pie chart representing all OSI Layer 4 protocols in use on the selected links, and a pie chart representing all OSI Layer 5/7 protocols in use on the selected links;

receive a user selection of one of the Layer 3 protocols;

display a second information level to the user, the second information level display comprising a pie chart representing all OSI Layer 3 protocols in use on the selected links, a pie chart representing OSI Layer 4 protocols associated with packets having the selected Layer 3 protocol in use on the selected links, and a pie chart representing all OSI Layer 5/7 protocols associated with packets having the selected Layer 3 protocol in use on the selected links;

receive a user selection of one of the Layer 4 protocols; and display a third information level to the user, the third information level display comprising a pie chart representing all OSI Layer 3 protocols in use on the selected links, a pie chart representing OSI Layer 4 protocols associated with packets having the selected Layer 3 protocol in use on the selected links, and a pie chart representing all OSI Layer 5/7 protocols associated with packets having both the selected Layer 3 protocol and the selected Layer 4 protocol in use on the selected links.

12. The computer program product of claim 11, wherein the sequence of instructions, upon execution by the processor, further causes the network monitoring system to:

highlight the selected Layer 3 protocol in the second information level display.

13. The computer program product of claim 12, wherein the sequence of instructions, upon execution by the processor, further causes the network monitoring system to:

highlight the selected Layer 4 protocol in the third information level display.

14. The computer program product of claim 11, wherein the sequence of instructions, upon execution by the processor, further causes the network monitoring system to:

highlight the selected Layer 3 protocol in the second information level display; and highlight the selected Layer 4 protocol in the third information level display.

15. The computer program product of claim 11, wherein the sequence of instructions, upon execution by the processor, further causes the network monitoring system to:

receive a user selection of one of the Layer 5/7 protocols; and display information specific to the selected Layer 5/7 protocol.

* * * * *